April 8, 1952  P. DE JESUS  2,592,122
PLAYING CARD

Original Filed Jan. 20, 1944  5 Sheets-Sheet 1

INVENTOR.
Pedro De Jesus
BY
ATTORNEY

April 8, 1952 P. DE JESUS 2,592,122
PLAYING CARD
Original Filed Jan. 20, 1944 5 Sheets-Sheet 2
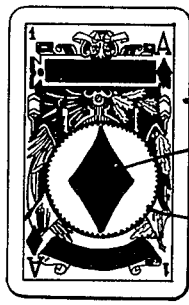 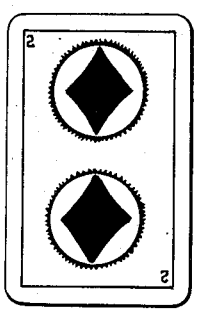 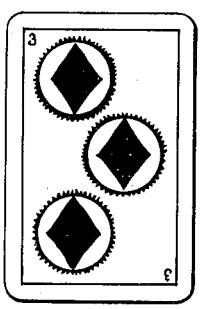 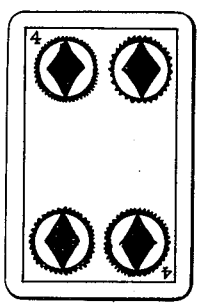
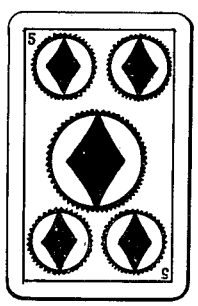 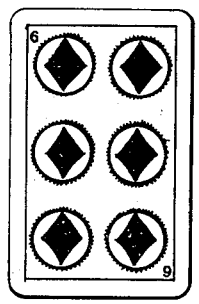 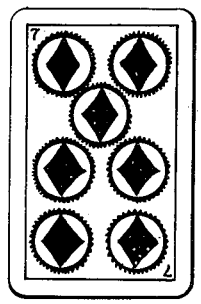 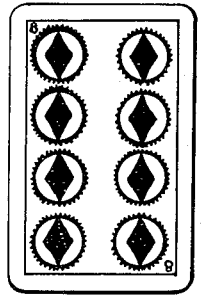
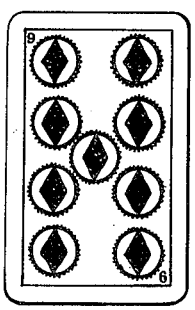 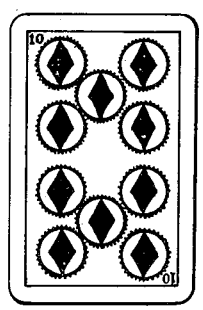 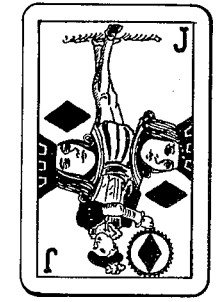 
Fig. 2
INVENTOR.
Pedro De Jesus
BY
ATTORNEY April 8, 1952 P. DE JESUS 2,592,122
PLAYING CARD
Original Filed Jan. 20, 1944 5 Sheets-Sheet 3
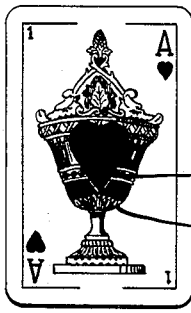
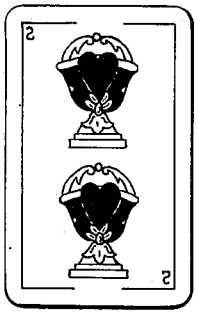
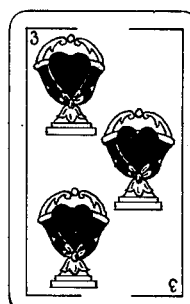
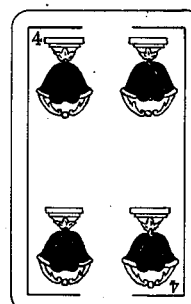
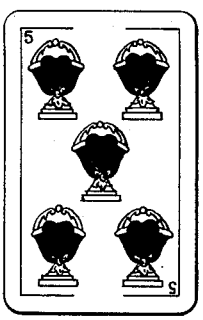
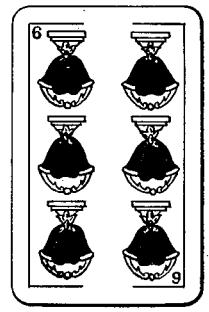
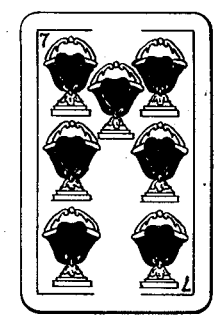
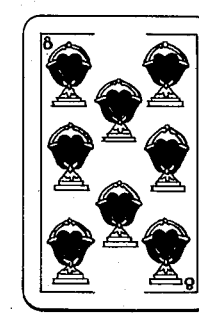
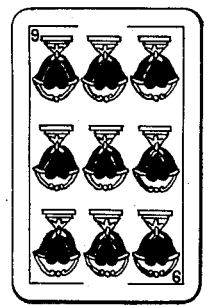
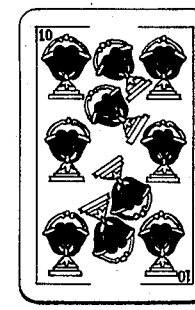
FIG. 3
INVENTOR.
Pedro De Jesus
BY
ATTORNEY April 8, 1952 — P. DE JESUS — 2,592,122
PLAYING CARD
Original Filed Jan. 20, 1944 — 5 Sheets-Sheet 4

FIG-4-

INVENTOR.
Pedro De Jesus
BY
ATTORNEY

April 8, 1952 P. DE JESUS 2,592,122
PLAYING CARD

Original Filed Jan. 20, 1944 5 Sheets-Sheet 5

INVENTOR.
Pedro De Jesus
BY
ATTORNEY

Patented Apr. 8, 1952

2,592,122

UNITED STATES PATENT OFFICE 2,592,122

PLAYING CARD

Pedro de Jesús, Bronx, N. Y.

Substituted for abandoned application Serial No. 518,923, January 20, 1944. This application April 18, 1949, Serial No. 88,219

4 Claims. (Cl. 273—152.1)

This invention relates to new and useful improvements in a playing card constituting one of a plurality of similar cards forming a deck of playing cards. This application is a substitute for my abandoned application, Serial No. 518,923, filed in the U. S. Patent Office on January 20, 1944.

More specifically, the invention proposes the construction of a playing card forming one of a deck of such cards which is imprinted with the English or French symbol and the Spanish symbol of the suit so that a deck of such cards may be used by a mixed group of persons accustomed to playing with the English or French deck or the Spanish deck.

Still further, it is proposed to form the card to include its respective suit designator for the English or French deck and the Spanish deck with these symbols artistically arranged, in a manner to produce a card which may be easily read by a person accustomed to playing with an English or French deck or a person accustomed to playing with a Spanish deck.

Another object of the invention proposes constructing a card consisting of an opaque backing sheet upon which superimposed transparent sheets are adapted to be mounted and each of which is imprinted with an English or French symbol or a Spanish symbol in opaque ink, in a manner so that when the transparent sheets are superimposed both of the symbols will be viewable from the front of the card.

Still another object of the invention proposes removably mounting the transparent sheets in position upon the backing sheet so that either of the two transparent sheets may be removed when not desired in a manner to permit the deck to be used as an English or French deck or a Spanish deck when so desired.

It is a further object of this invention to construct a playing card which is simple and durable and which may be printed and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 2 illustrates the thirteen cards of the diamond suit imprinted with the proper English or French symbol and the Spanish symbol.

Fig. 3 illustrates the thirteen cards of the heart suit imprinted with the proper English or French symbol and the Spanish symbol.

The deck of playing cards consists of a group of cards for the club, diamond, heart and spade suits and each card has its value and suit imprinted in English or French symbols and in Spanish symbols which are superimposed on each other.

Figure 1:
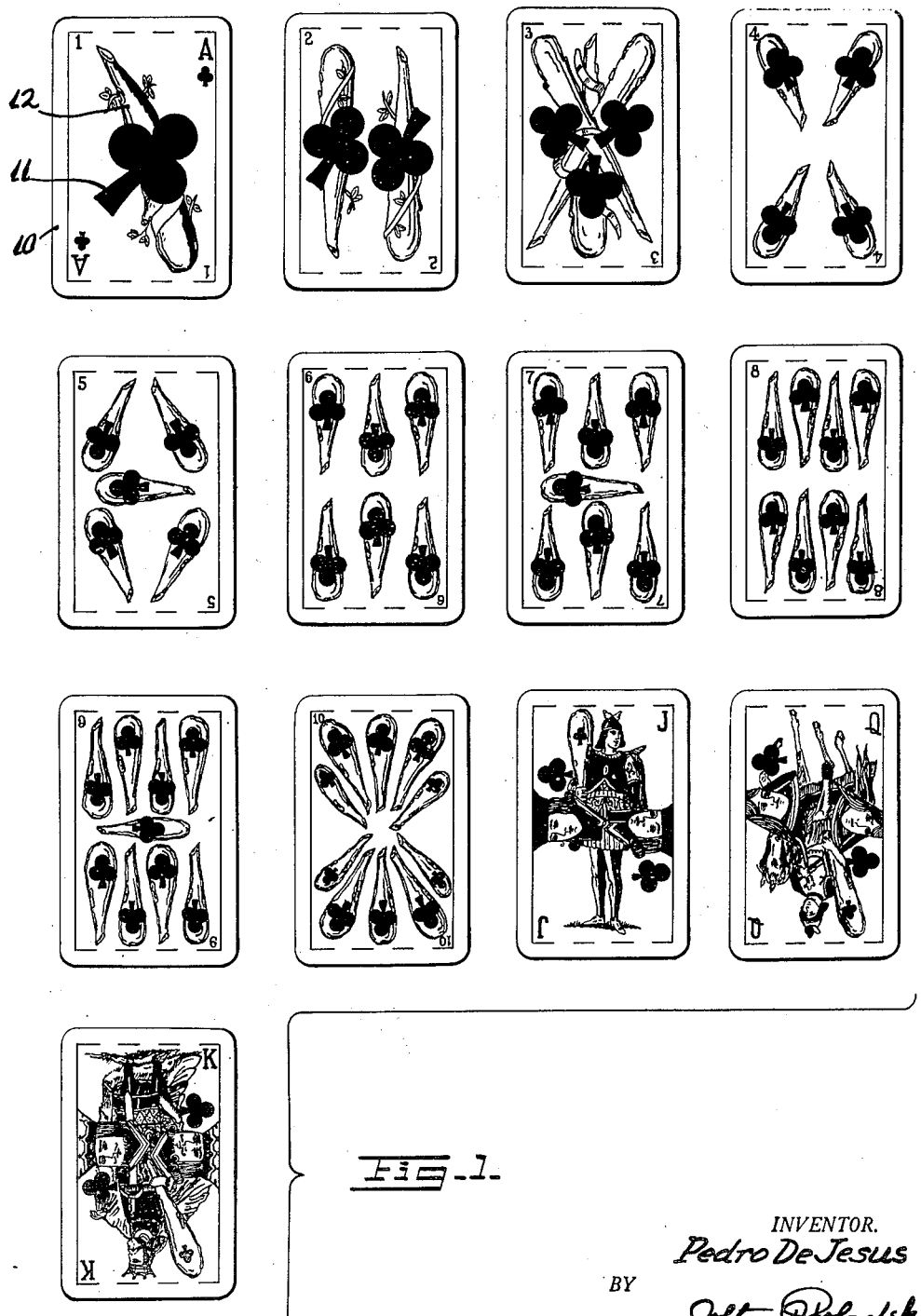
Fig. 1 illustrates the thirteen cards of the club suit imprinted with the proper English or French symbol and the Spanish symbol.

In Fig. 1 the thirteen cards of the club suit are illustrated. Each of these cards 10, for the club suit, is imprinted with the English or French symbol 11, consisting of a three leaved clover, and the Spanish symbol 12, a club.

In Fig. 2 the thirteen cards of the diamond suit are illustrated. Each of these cards 10, for the diamond suit, is imprinted with the English or French symbol 13, a diamond, and the Spanish symbol 14, a circular configuration.

In Fig. 3 the thirteen cards of the heart suit are illustrated. Each of these cards 10, for the heart suit, is imprinted with the English or French symbol 15, a heart, and the Spanish symbol 16, a decorative vase.

Figure 4:
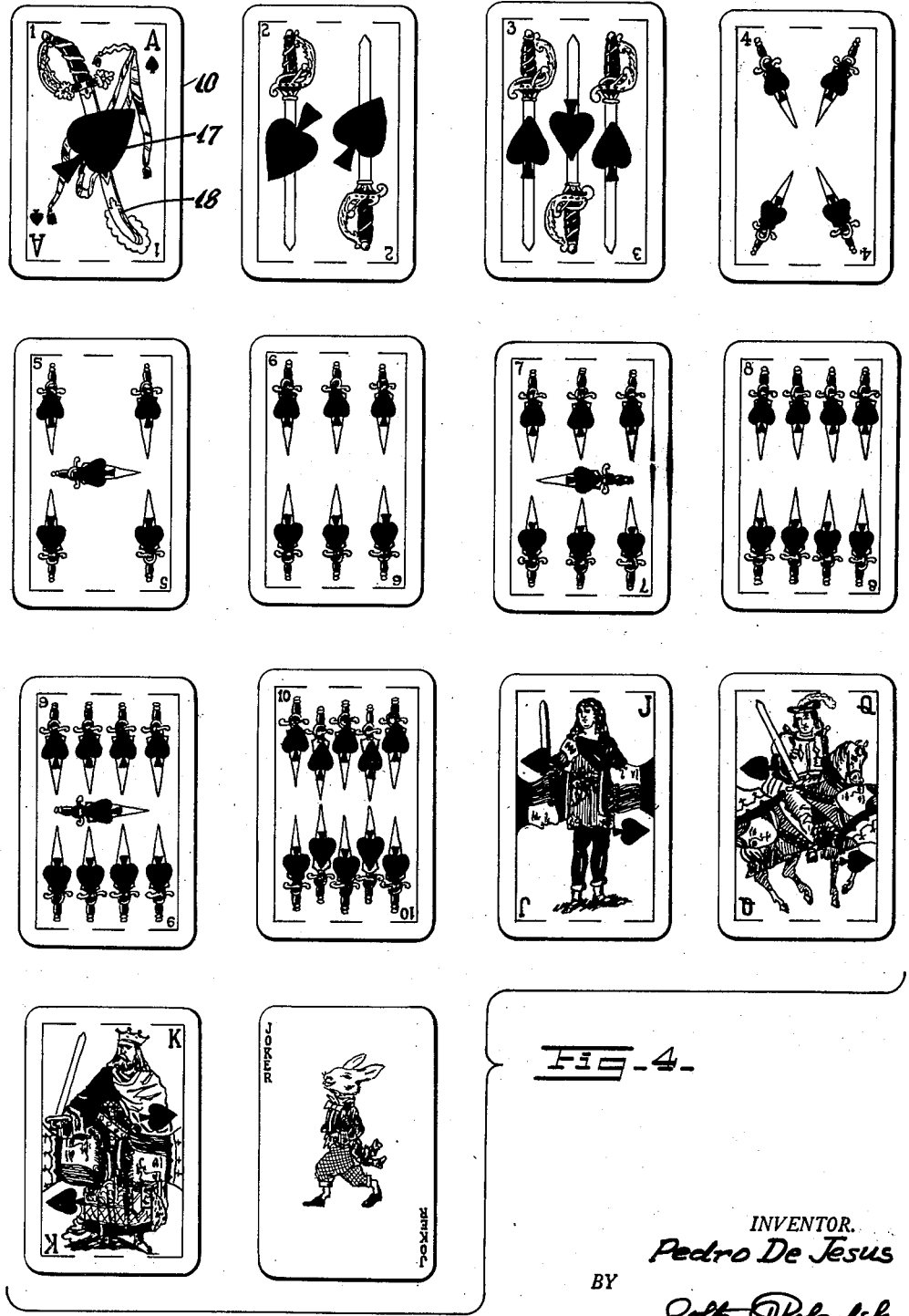
Fig. 4 illustrates the thirteen cards of the spade suit imprinted with the proper English or French symbol and the Spanish symbol.
Figure 5:
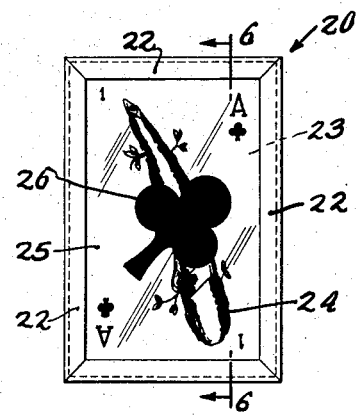
Fig. 5 is a front elevational view of one card of a deck of cards constructed in accordance with a modification of this invention.
Figure 6:
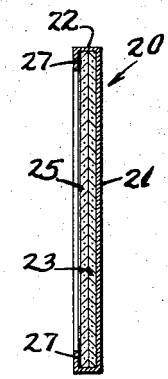
Fig. 6 is a vertical sectional view taken on the line 6—6 of Fig. 5.
Figure 7:
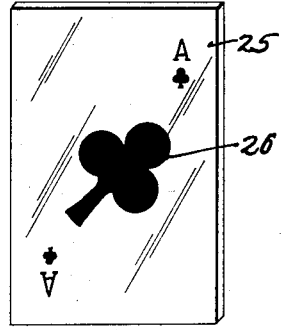
Fig. 7 is a perspective view of the transparent sheet used in the form of the invention shown in Fig. 5 and imprinted with the English or French symbol.
Figure 8:
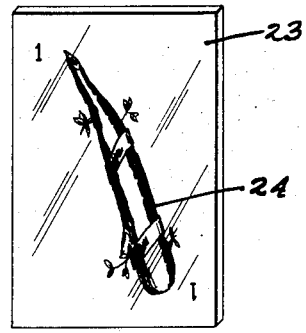
Fig. 8 is a perspective view of the other transparent sheet used in the form of the invention shown in Fig. 5 and imprinted with the Spanish symbol.

In Fig. 4 the thirteen cards of the spade suit are illustrated. Each of the cards 10, for the spade suit, is imprinted with the English or French symbol 17, a spade, and the Spanish symbol 18, a sword.

The feature of the deck of cards resides in the fact that the imprinting of both the English or French symbol and the Spanish symbol, permits the deck to be used by persons accustomed to using the English or French deck or persons accustomed to using the Spanish, or by a mixed group consisting of some accustomed to using the English or French deck, and since the deck is composed of four suits of thirteen cards each, making fifty-two cards in all, the deck may be used for playing any game in which a fifty-two card deck is used. Such games include: rummy, five-hundred, bridge, poker and the like.

In Figs. 5 to 8, one card of a deck of cards constructed in accordance with a modification of this invention is illustrated. This card 20 consists of a backing sheet 21 of opaque material formed along its four sides with front edge flaps 22.

A transparent sheet 23 imprinted on its face with the Spanish symbol 24 is superimposed upon the backing sheet 21. The card 20 shown, merely by way of illustration, is the Spanish symbol for clubs, a club. A second transparent sheet 25 imprinted on its face with the English or French symbol 26 and is superimposed upon the first transparent sheet. The symbols 24 and 26 are imprinted upon the transparent sheets 23 and 25 in opaque ink, so that regardless of which transparent sheet is on top the symbol of the lowermost transparent sheet may be viewed.

The transparent sheets 23 and 25 are superimposed upon the backing sheet 21 with their edges disposed between the flaps 22 and the flaps 22 are provided with an adhesive 27 of the pressure operating type. The adhesive 27 acts to releasably secure the flaps down upon the transparent sheets holding them in position upon the backing sheet 21.

The manner of using the cards constructed in accordance with this invention, is as follows:

If the cards are to be used by a mixed group of players in which some are accustomed to the English and French symbols and some are accustomed to the Spanish symbols, the cards may be used with both of the transparent sheets in position exposing the English or French symbols and the Spanish symbols.

However, if the group using the cards consists of players accustomed to using the English or French symbols or the Spanish symbols, the unused transparent sheet with its respective symbol may be removed. This is done by pulling up the front edge flaps 22 to release the transparent sheets 23 and 25 so that the unused one may be removed. The transparent sheet 23 or 25 bearing the symbol to be used is then superimposed upon the backing sheet and the front flaps pressed in position causing the adhesive 27 to adhere to the face of the transparent sheet being used securing it in position upon the face of the back sheet.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A playing card comprising a pair of superimposed transparent sheets one imprinted with a French or English playing card symbol and the other imprinted with a corresponding Spanish playing card symbol, a backing sheet extended along the bottom face of the bottommost transparent sheet, said backing sheet being formed along its edges with flaps bent about the edges of the superimposed sheets and extended inward along the top face of the topmost sheet, and a pressure sensitive adhesive releasably securing the free edges of said flaps to the top face of the topmost transparent sheet for securing the sheets in their superimposed position on said backing sheet.

2. A playing card comprising a pair of superimposed transparent sheets one imprinted with a French or English playing card symbol and the other imprinted with a corresponding Spanish playing card symbol, a backing sheet extended along the bottom face of the bottommost transparent sheet, said backing sheet being formed along its edges with flaps bent about the edges of the superimposed sheets and extended inward along the top face of the topmost sheet, and a pressure sensitive adhesive releasably securing the free edges of said flaps to the top face of the topmost transparent sheet for securing the sheets in their superimposed position on said backing sheet, said backing sheet being made of opaque material so that said symbols cannot be viewed from the back of the card.

3. A playing card comprising a pair of superimposed transparent sheets one imprinted with a French or English playing card symbol and the other imprinted with a corresponding Spanish playing card symbol, a backing sheet extended along the bottom face of the bottommost transparent sheet, said backing sheet being formed along its edges with flaps bent about the edges of the superimposed transparent sheets and extended inward along the top face of the topmost transparent sheet, and an adhesive releasably securing the free edges of said flaps to the top face of the topmost sheet for securing said transparent sheets in their superimposed position on said backing sheet, said adhesive being of the pressure operating type, so that said flaps may be separated from the top face of the topmost transparent sheet permitting said transparent sheets to be separated and used independently with said back sheet when desired.

4. A playing card comprising a back sheet having edge flaps, a transparent sheet imprinted in opaque ink with a suit and card value in an English or French symbol, a second transparent sheet superimposed on said first transparent sheet and imprinted in opaque ink with a suit and card value in a Spanish symbol, said superimposed transparent sheets being superimposed on said backing sheet, said edge flaps being folded about the edges of said transparent sheets to have their free edge portions extended across the outer face of said second transparent sheet, and pressure sensitive adhesive releasably securing the free edge portions of said edge flaps to the outer face of said second transparent sheet.

PEDRO DE JESÚS.

REFERENCES CITED

The following references are of record in the file of this patent:

UNITED STATES PATENTS

| Number | Name | Date |
|---|---|---|
| 179,847 | Dougherty | July 18, 1876 |
| 1,557,284 | Horowitz | Oct. 13, 1925 |
| 1,693,525 | Neiderlitz | Nov. 27, 1928 |
| 2,151,055 | Stark | Mar. 21, 1939 |
| 2,319,519 | Rosaire | May 18, 1943 |
| 2,432,928 | Palmquist | Dec. 16, 1947 |